United States Patent
Aghvami et al.

(10) Patent No.: US 8,750,243 B2
(45) Date of Patent: Jun. 10, 2014

(54) NETWORK MOBILITY

(75) Inventors: Abdol Hamid Aghvami, London (GB); Paul Anthony Pangalos, London (GB); George Kamel, London (GB); Andrej Mihailovic, London (GB)

(73) Assignee: Uniloc USA, Inc., Plano, TX (US)

( * ) Notice: Subject to any disclaimer, the term of this patent is extended or adjusted under 35 U.S.C. 154(b) by 1158 days.

(21) Appl. No.: 12/634,394

(22) Filed: Dec. 9, 2009

(65) Prior Publication Data

US 2010/0150108 A1 Jun. 17, 2010

(30) Foreign Application Priority Data

Dec. 15, 2008 (GB) .................................. 0822815.7

(51) Int. Cl.
*H04W 4/00* (2009.01)

(52) U.S. Cl.
USPC .......................................... 370/331; 370/328

(58) Field of Classification Search
USPC .................................................. 370/328, 331
See application file for complete search history.

(56) References Cited

U.S. PATENT DOCUMENTS

| | | | |
|---|---|---|---|
| 2004/0105420 A1* | 6/2004 | Takeda et al. ................. | 370/349 |
| 2004/0142657 A1* | 7/2004 | Maeda ......................... | 455/11.1 |
| 2004/0240414 A1* | 12/2004 | Fan et al. ...................... | 370/332 |
| 2007/0147320 A1* | 6/2007 | Sattari et al. .................. | 370/338 |
| 2010/0290621 A1* | 11/2010 | Muhanna et al. ............ | 380/270 |

OTHER PUBLICATIONS

Nelson, R., et al., "A Discussion of Bandwith Broker Requirements for Internet2 Qbone Deployment," Internet2 Qbone BB Advisory Council, Aug. 1999, pp. 1-30.
Fu, X., et al., "QoS-Conditionalized Handoff for Mobile IPv6," Networking 2002, 2002, pp. 721-730, Springer-Verlag, Berlin.
Braden, R., et al., "Integrated Services in the Internet Architecture: an Overview," Jul. 1994, pp. 1-28.
Braden, R., et al., "Resource ReSerVation Protocol (RSVP)—Version 1 Functional Specification," Sep. 1997, pp. 1-112.
Perkins, C., "IP Mobility Support for IPv4," http://tools.ietf.org/rfc/rfc3344.txt, Aug. 2002, pp. 1-87.

(Continued)

*Primary Examiner* — Noel Beharry
*Assistant Examiner* — Kodzovi Acolatse
(74) *Attorney, Agent, or Firm* — Sean D. Burdick

(57) ABSTRACT

In a wireless network environment comprising a mobile router serving a moving network, said mobile router for attaching to a packet-switched access network that uses a micro-mobility protocol and a Quality of Service (QoS) protocol to route packet data to and from said mobile router, wherein said mobile router has a QoS aggregate requirement generated by nodes attached thereto, a method of handover of said mobile router to a mobility agent in said access network, which method comprises the steps of: (i) said mobile router sends a QoS request message to said mobility agent, which QoS request message comprises a QoS parameter representing said QoS aggregate; (ii) upon receipt by said mobility agent, said access network takes a QoS admission decision on the basis of said QoS parameter; and (iii) said mobility agent sends a QoS acknowledgement to said mobile router whereby said mobility agent informs said mobile router of the outcome of said QoS admission decision; characterized by the step of (iv) if said QoS admission decision is that said mobility agent cannot handle all of said QoS aggregate, said QoS acknowledgement comprises an identity of one or more alternative mobility agent that might meet at least a part of said QoS aggregate that will not be provided by said mobility agent.

16 Claims, 5 Drawing Sheets

(56) References Cited

OTHER PUBLICATIONS

Harrington, D., et al., "An Architecture for Describing Simple Network Management Protocol (SNMP) Management Frameworks," RFC 3411, IETF, Dec. 2002, pp. 1-64.

Johnson, D., et al., "Mobility Support in IPv6," RFC 3775, Jun. 2004, pp. 1-165.

Arkko, J., et al., "Using IPsec to Protect Mobile IPv6 Signaling Between Mobile Nodes and Home Agents," http://tools.ietf.org/rfc/rfc3776.txt, Jun. 2004, pp. 1-36.

Devarapalli, V., et al., "Network Mobility (NEMO) Basic Support Protocol," Jan. 2005, pp. 1-33.

Soliman, H., et al., "Hierarchical Mobile IPv6 Mobility Management (HMIPv6)," Aug. 2005, pp. 1-29.

* cited by examiner

NETWORK MOBILITY

CROSS REFERENCE TO RELATED APPLICATION(S)

This Application claims foreign priority to United Kingdom Patent Application Serial Number 08 228 15.7 filed Dec. 15, 2008, the entire disclosure of which is herein incorporated by reference.

FIELD OF THE INVENTION

The present invention relates to a method of handover of a mobile router to a mobility agent, to a packet-switched access network for taking part in the method, to a router for use in the method, to a mobile router for use in the method, and to a vehicle comprising such a mobile router.

BACKGROUND TO THE INVENTION

Many different requirements are expected of the network layer in all-IP access networks (e.g. 4G cellular networks). Two in particular are mobility and QoS. The former enables users to communicate seamlessly with remote network nodes via the Internet wherever they are, whereas the latter enables users to receive different levels of service for certain types of traffic.

Mobility at the network layer is concerned with maintaining the routability of packet data to and from a mobile node when that mobile node moves away from its home access network. The main candidate for provision of this functionality is Mobile IP (MIP). Very briefly MIP relies on a Home Agent in the home access network to tunnel IP packets to the domain where the mobile node is attached. The mobile node forms a Care-of Address (CoA) that is globally topologically correct in the network to which it is attached. The Home Agent encapsulates packets that it receives addressed to the mobile node's home address in another IP packet addressed to the CoA. In this way packet data may still reach the mobile node even when it is away from the home network. Further details of Mobile IP can be found in RFC 3344, 3775 and 3776 to which reference is specifically made.

However, when a mobile node hands over to a new access router, binding updates are triggered to the Home Agent, etc. These binding updates can introduce unwanted delays and loss of packets, and thereby degradation in performance from the user's perspective. When attached to a particular wireless access network (such as a cellular network), a mobile node may change its point of attachment (i.e. access router) quite frequently (e.g. every few minutes or more often, particularly if on the move). Each change triggers configuration of a new CoA, followed by the necessary binding updates. Doing this frequently (e.g. every few minutes) is not practical.

Hierarchical Mobile IPv6 (HMIPv6) has been proposed (see RFC 4140) to address this problem. HMIPv6 provides a mobility agent known as a Mobility Anchor Point (MAP) in the access network. A MAP is a logical entity that handles micro-mobility for the mobile node. Micro-mobility is a change in point of attachment of the mobile node from one access router to another, both of which are within the same domain of the access network. Whenever this happens, the mobile node sends a binding update to the MAP (comprising a new Link local CoA or LCoA), but the mobile node's primary CoA (or Regional CoA or RCoA) remains unchanged. In this way the mobile node can move between access routers in the same administrative domain without having to send a binding update to the Home Agent. In contrast when the mobile node changes point of attachment to an access router in a different access network, this is a macro-mobility event i.e. requiring a binding update to be sent to the Home Agent of the mobile node.

It is possible that the mobile node may take the form of a moving network, a specific example of which is called a 'network in motion' or NEMO network. Network mobility support is concerned with managing the mobility of an entire network, viewed as a single unit, which changes its point of attachment to a fixed network infrastructure and thus its reachability in the network topology, most frequently the Internet. The mobile part of the network is referred to as a 'moving network', that can be installed in a train for example, and which includes one or more 'mobile routers' (MRs) which act as gateways to the moving network and connect it to the global Internet. Nodes behind the MR(s) can be classified as "Local Fixed Nodes" (LFNs) such as wired Internet access point on the train, Local Mobile Nodes (LMNs) such as mobile PDAs carried by personnel working on the train, and Visiting Mobile Nodes (VMNs) such as notebook computers, PDAs, portable media players, hand-held gaming devices and mobile telephones carried by passengers on the train. In most cases, the internal structure of the moving network will in effect be relatively stable (no dynamic change of the topology), subject to joining and leaving of VMNs and LMNs. The MR provides wireless access for the network nodes via access routers that are part of the fixed network infrastructure. Access routers include satellites, UMTS Node Bs, GSM base stations, DVB transmitters and wireless access points.

The mobility of moving networks does not cause the network nodes to change their own physical point of attachment, although they happen to change their topological location with respect to the global Internet. If network mobility is not explicitly supported by some mechanism, the mobility of the MR results in mobile nodes losing Internet access and breaking ongoing connections with correspondent nodes (hereinafter CNs) in the global Internet. In addition, the communication path between the network nodes and the CNs becomes sub-optimal, and nested mobility will cause yet worse routing paths.

The current solution to provide network mobility is promoted by the NEtworks in MOtion (NEMO) working group of the Internet Engineering Task Force (see www.ietf.org/html.charters/nemo-charter.html). "NEMO Basic Support" (see RFC 3963 at the same website) aims to provide connection continuity for nodes in the moving network.

NEMO Basic Support provides connection (or session) continuity (e.g. continuity for TCP connections) by creating a "bi-directional tunnel" between the MR and its home network. This bi-directional tunnel is formed by encapsulating IP packets to and from the network nodes in IP packets addressed between the MR and a Home Agent on the MR's home network. In this way traffic flows are routed via the MR and its Home Agent and the mobility of the moving network is transparent to all network nodes attached thereto.

We have realized that mobile routers that arrive within the signal coverage of an access network that operates both a micro-mobility protocol, such as HMIPv6, and a QoS protocol, face particular difficulties. In particular, when an access network operates both a mobility protocol (such as HMIPv6) and a QoS protocol (such as DiffServ or IntServ), the requirement that all packets to and from the moving network pass through a single mobility agent creates a bottleneck which will lead to congestion in the router hosting the mobility agent and at other routers nearby.

Furthermore, the utilization of the mobility agent's resources is always likely to be relatively high since all traffic within its domain must pass through it. This bottleneck can be particularly problematic for moving networks utilising aggregated QoS reservations, in which a high number of mobile terminals (e.g. ten, twenty, one hundred or more) may require the simultaneous and substantially seamless handover of ongoing sessions to a single mobility agent. We have realised that the main problem is the possibility that no single mobility agent within the new network is likely to have the capacity to support the resource requirements of the moving network as a whole. If so, the mobility agent will reject the resource request of the moving network, causing the mobile router either to blindly seek alternative mobility agents with which to make a resource reservation, or negotiate a lower resource reservation with the mobility agent, with the intention of either dropping the sessions of some mobile nodes, or proportionally reducing the QoS given to all sessions.

In both of these situations, handover latency will be significantly increased as the mobile router attempts to establish a reservation with a mobility agent that can accommodate the resource requirements of the moving network, assuming that there is another mobility agent available in that access network.

SUMMARY OF THE INVENTION

According to the present invention there is provided in a wireless network environment comprising a mobile router serving a moving network, said mobile router for attaching to a packet-switched access network that uses a micro-mobility protocol and a Quality of Service (QoS) protocol to route packet data to and from said mobile router, wherein said mobile router has a QoS aggregate requirement generated by nodes attached thereto, a method of handover of said mobile router to a mobility agent in said access network, which method comprises the steps of:

(i) said mobile router sends a QoS request message to said mobility agent, which QoS request message comprises a QoS parameter representing said QoS aggregate;

(ii) upon receipt by said mobility agent, said access network takes a QoS admission decision on the basis of said QoS parameter; and (iii) said mobility agent sends a QoS acknowledgement to said mobile router whereby said mobility agent informs said mobile router of the outcome of said QoS admission decision; characterized by the step of (iv) if said QoS admission decision is that said mobility agent cannot handle all of said QoS aggregate, said QoS acknowledgement comprises an identity of one or more alternative mobility agent that might meet at least a part of said QoS aggregate that will not be provided by said mobility agent. In some embodiments of the invention, providing the identity of one or more alternative mobility agent to the mobile router provides the possibility that the mobile router will not have to downgrade its QoS request and/or drop certain sessions. In particular, by registering with alternative mobility agents the mobile router may be able to distribute its traffic across several different mobility agents. It will be understood that the term moving network does mean that the network is always in motion, but rather is intended to reflect its capability to move or be in motion from time to time.

In some embodiments, the mobile router comprises a single interface for communication with the 'fixed' part of the access network infrastructure, and all of the traffic of the mobile router is sent to a single access router at any one particular time.

The micro-mobility protocol may be a tunneling type such as HMIPv6, or any similar protocol similar, or any protocol derived from HMIPv6. The Quality of Service (QoS) protocol may be IntServ or DiffServ, or any similar protocol similar, or any protocol derived therefrom. Accordingly, the QoS admission decision may be taken by a single logical entity, such as a bandwidth broker, for the whole network (e.g. when operating DiffServ); alternatively the QoS admission decision may be taken by each mobility agent that receives a QoS request based on knowledge the link state of paths in the network. Such link-state knowledge may be gained from an intra-domain link-state routing algorithm such as QoSPF for example.

In certain embodiments said QoS request comprises a Binding Update message in which said QoS parameter representing said QoS aggregate is sent within a Mobility Options part of said Binding Update message, whereby upon receipt of said Binding Update said mobility agent is informed both about a care-of address that said mobile router intends to use and a desired QoS. The Binding Update may be a local Binding Update in accordance with that specified in RFC 4140. By using a Binding Update message to send the QoS parameter(s) the mobility agent is informed at the same time about mobility and about the QoS requirements of the moving network. In other embodiments the QoS request message may comprise a login type message that comprises said QoS parameter.

In some embodiments, said QoS admission decision comprises determining a proportion of said QoS aggregate that said mobility agent can provide, and sending data representing said proportion in said QoS acknowledgement to said mobile router. The proportion can be given in terms of one or more permitted or rejected traffic class (e.g. a UMTS traffic class), and/or in terms of a certain permitted bandwidth.

In certain embodiments said QoS acknowledgement comprises a Binding Acknowledgement type message and said identity of said one or more alternative mobility agent is sent within a Mobility options part of said Binding Update. The Binding Acknowledgement may be a local Binding Acknowledgement as described in RFC 4140. By using a Binding Acknowledgement, the mobile router is informed at the same time both about mobility (i.e. whether or not it registration request has been successful) and about QoS (i.e. whether or not the mobility agent can handle at least some of its QoS aggregate). This helps to reduce the time taken for completion of handover.

In some embodiments said QoS acknowledgement further comprises an indication of resources available at said one or more other mobility agent. For example, the QoS Acknowledgement may indicate how much bandwidth (e.g. in MB s$^{-1}$) is available, and/or which traffic classes are acceptable at each alternative mobility agent.

In certain embodiments data representing QoS that will be provided by said mobility agent for said mobile router is sent in a Mobility Options part of said Binding Acknowledgement, whereby upon receipt of said Binding Acknowledgement said mobile router is informed both about a care-of address that has been registered by said mobility agent for said mobile router and about the QoS that said mobility agent is able provide.

In some embodiments upon receipt of said QoS acknowledgement said mobile router sends a further QoS request to one of said one or more alternative mobility agent, which further QoS request seeks reservation of the remainder of said QoS aggregate that has not been admitted by said access network through said mobility agent. In this way the mobile router may establish more than one route for its traffic across the access network, reducing the likelihood that its QoS aggregate must be downgraded.

In certain embodiments the method further comprises the steps of said mobile router sending QoS requests to different mobility agents, until said QoS aggregate is supported by said access network via a number of different mobility agents, until no untried mobility agents are left in said access network, or until a predetermined number of QoS requests have been sent by said mobile router.

After having made one or more registration with one or more mobility agent, the mobile router advises its home agent, known as a mobile router home agent, thereby establishing several tunnels through which data may flow to and from the moving network.

In some embodiments, the method further comprises the steps of said mobile router registering with at least two mobility agents, and sending at least one Binding Update to a mobile router home agent whereby each care-of address (RCoA) of said mobile router at each mobility agent is stored in a binding cache of said mobile router home agent, so that traffic passing between said mobile router home agent and said mobile router is split between at least two tunnels, each tunnel passing through a different mobility agent, whereby said access network is able to support a greater proportion of said QoS aggregate than would otherwise be supported by a single mobility agent. The Binding Update may be of the type specified in the NEMO Basic Support Protocol.

In certain embodiments said Binding Update comprises a list of the or each care-of address belonging to the mobile router, the method further comprising the step of upon receipt of said Binding Update said mobile router home agent amending its binding cache to match said list. In this way the mobile router keeps the mobile router home agent informed about all of its current bindings with each binding update.

In some embodiments said Binding Update further comprises a QoS parameter which is mapped to a respective care-of address in said list, the method further comprising the step of said mobile router home agent splitting downstream traffic between said care-of addresses according to said QoS parameters. In this way the mobile router informs the mobile router home agent what QoS it has agreed with each mobility agent, and the mobile router home agent splits traffic through each tunnel accordingly. If the mobile router is in handover from one mobility agent to another (either in the same or different access networks), the presence of two tunnels, one through the old mobility agent and another through the new, helps to reduce packet loss and delays during the handover.

In certain embodiments, the method further comprises the steps of sending relatively delay intolerant traffic through one of said at least two tunnels, and sending relatively delay tolerant traffic through another of said at least two tunnels.

In certain embodiments, the method further comprises the step of sending one or more class of traffic through one of said at least two tunnels, and sending at least one other class of traffic through another of said at least two tunnels.

In certain embodiments, (i) follows completion of a mobility part of said handover. The mobility part of the handover may comprise the steps of the mobile router sending a local binding update, said mobility agent registering the care-of address of said mobile router, and sending a Binding Acknowledgement to the mobile router to confirm that the new care-of address under said micro-mobility protocol is registered. Thus the invention is able to operate independently of mobility if desired.

In some embodiments said QoS request comprises a combined mobility and QoS request, whereby upon receipt of said combined request said mobility agent registers said mobile router in a binding cache for the purposes of mobility, and said access network takes said QoS admission decision for said QoS aggregate of said mobile router, before sending a combined mobility and QoS acknowledgement to said mobile router. In this way, both mobility and QoS can be handled together by the network, thereby reducing delays caused by performing each part sequentially. The combined mobility and QoS request may take the form of a local Binding Update as mentioned above, in which the Mobility options part of the message is used to send QoS information. Thus the invention also provides a way for mobility and QoS procedures to be combined, which speeds up the handover process and reduces chances of packet loss and session interruption.

In accordance with another aspect of the present invention there is provided a packet-switched wireless access network configured to perform the packet-switched access network method steps set out above.

In accordance with another aspect of the present invention there is provided a router comprising a memory storing computer executable instructions that when executed perform the mobility agent method steps set out above.

In accordance with yet another aspect of the present invention there is provided a mobile router comprising a memory storing computer executable instructions that when executed perform the mobile router method steps set out above.

In accordance with another aspect of the present invention there is provided a vehicle comprising a mobile router as set out above.

In accordance with another aspect of the present invention there is provided in a wireless network environment comprising a mobile router serving a moving network, said mobile router for attaching to a packet-switched access network that uses a micro-mobility protocol and a Quality of Service (QoS) protocol to route packet data to and from said mobile router, wherein said mobile router has a QoS aggregate requirement generated by nodes attached thereto, a method of handover of said mobile router to a mobility agent in said access network, which method comprises the steps of said mobile router sending a combined mobility and QoS request to said mobility agent, whereby upon receipt of said request said mobility agent registers said mobile router in a binding cache for the purposes of mobility, and said access network makes a QoS admission decision for said QoS aggregate of said mobile router, before sending a combined mobility and QoS acknowledgement to said mobile router.

BRIEF DESCRIPTION OF THE FIGURES

For a better understanding of how the invention may be put into practice, preferred embodiments of the invention applied in a heterogeneous network environment comprising two access networks will be described, by way of example only, with reference to the accompanying drawings, in which.

DETAILED DESCRIPTION OF THE PREFERRED EMBODIMENT(S)

Figure 1:
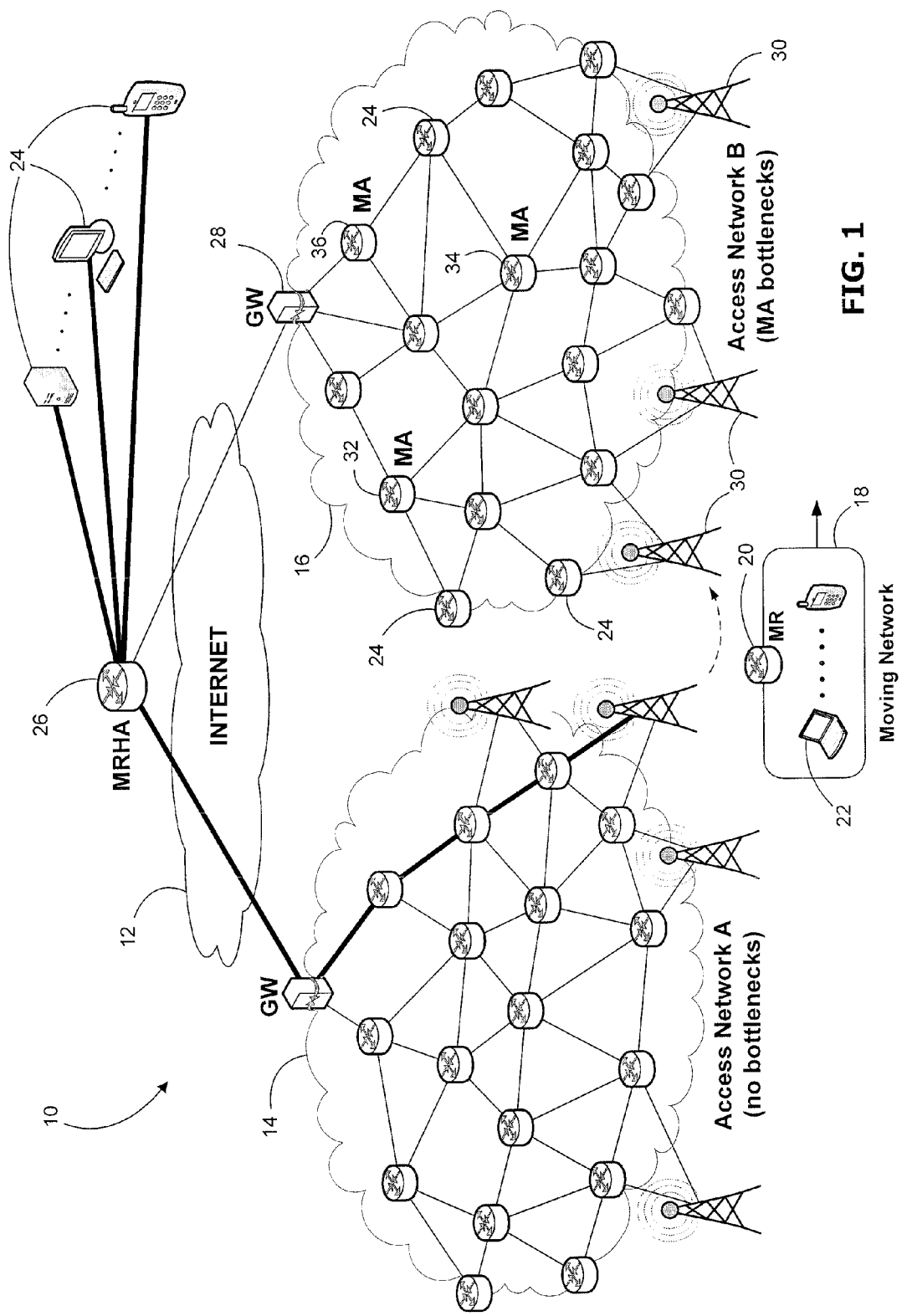
FIG. 1 is a schematic block diagram of a network environment comprising two access networks, one of which does not operate a tunneling-type micro-mobility protocol and the other which does operate such a protocol.

Referring to FIG. 1 an IP-based (IPv4 or IPv6 or a mixture thereof may be used in any of the networks mentioned herein) network environment generally identified by reference numeral 10 comprises an IP backbone 12 having a number of interconnected routers that provide access for network nodes to data and services stored on remote servers for example. As such the IP backbone 12 may form part of the Internet. In this embodiment any of two IP-based access networks 14 and 16 provide access for a moving network 18 (also known as a network in motion or a NEMO network) to the IP backbone 12, although there may be any number of access networks and moving networks of course. The name 'moving network' should be taken to imply that the network is permanently in motion; rather the term reflects the ability of a network to be in motion from time to time, such as networks provided in vehicles or other modes of transport. The access networks 14 and 16 may be an IP-based cellular network (such as 3GPP Release 5 or 6, UMTS Long Term Evolution (LTE) or any future IP-enabled cellular network) or the combination of an ISP and a number of WLAN routers for example.

The moving network 18 comprises a mobile router (MR) 20, serving a Visiting Mobile Node (VMN) 22 (that is multi-mode) via an access point (AP) not shown. The AP may be a wireless access point or a wired access point. The moving network 18 is part of a train (or other vehicle such as a bus, coach or boat) that moves relative to the two access networks 14 and 16. As such, the moving network 18 is physically separate from the access networks 14 and 16 but may communicate with one or more of them by means of a wireless link. The MR 20 has an ingress interface for receiving IP packets from and transmitting IP packets to network nodes in the moving network 18, and an egress interface for receiving IP packets from and transmitting IP packets to the fixed packet-switched network i.e. access network 14 or 16. As explained above, one of the aims of the NEMO Basic Support is to ensure that the motion of the moving network 18 is transparent to any network nodes (LFN, LMN and/or VMN) behind the MR 20. Motion of the train past access routers necessitates network layer handover of service from one access router to another. Since the MR 20 connects an entire network to remote packet networks, each change in point of attachment (i.e. change in access router) to the remote packet networks causes the reachability of the entire moving network 18 to change. Without appropriate mechanisms, connections established between nodes in the moving network 18 and nodes in the remote packet networks cannot be maintained across each handover. Connection continuity is primarily achieved in NEMO Basic Support through establishment of a bidirectional tunnel (herein NEMOBT) between the MR 20 and a Home Agent (MRHA) 26 of the MR 12. Aspects of the operation of the NEMOBT relevant to the present invention will be briefly described below. Further details can be found in RFC 3963.

Access to the IP backbone 12 enables LFNs, LMNs and VMNs 22 within the moving network 18 to communicate with one or more remote correspondent node (CN) 24. As shown the CN 24 may be a media server, a web server or another mobile node or moving network for example.

Each access network 14 and 16 defines an administrative domain comprising a number of interconnected routers; therefore the domain is scoped so that at the edges of the network administration packets (such as link-state advertisements are dropped). Furthermore each access network 14 and 16, and the mobile router 20, and the LFN, LMN and VMNs are able to operate Mobile IPv6 (MIPv6—see RFC 3775) and Hierarchical Mobile IPv6 (HMIPv6) as described in RFC 4140, or any functionally similar protocols. Both of these RFCs are fully incorporated herein by reference for all purposes. Thus each access network 14 and 16 comprises one or more router having the functionality of a mobility agent (or Mobility Anchor Point (MAP) in the terms of RFC 4140). The MAP is used by the moving network 18 as a local Home Agent so that handovers between access routers in the same domain do not trigger a binding update to the MRHA 26 of the mobile router 20. The domain of each MAP is defined by the access routers that advertise the MAP Option. As such there may be more than one MAP per access network.

Each access network 14 and 16 is substantially similar in terms of hardware components and therefore only access network 16 will be described in detail. Access network 16 comprises a number of interconnected IP packet routers 24. A gateway router (GW) 28 is the only entry and exit point of the access network 14 for packet traffic to and from the IP backbone 12. Each router 24 is IntServ-capable (see e.g. RFC 1633) and resources may be reserved using a reservation protocol such as RSVP (see RFC 2205). As such each router 24 comprises: a packet scheduler for managing the forwarding of different packet streams that arrive; a classifier for mapping incoming packets to the right traffic class; and an admission control component for implementing a decision algorithm to determine whether a new flow can be granted the requested QoS without impacting earlier guarantees.

A number of IP-enabled access routers (ARs) 30 are located at the edge of the access network 16. Each access router 30 is a single hop (at the network layer) from the moving network 18, and each is connected to a wireless transceiver such as Node B or WLAN router for example.

As mentioned above, the access network comprises one or more MAP or mobility agent. In this embodiment three mobility agents hereinafter referred to as Enhanced Nodes (EN) 32, 34 and 36 have the basic functionality of one of the routers 24 and the functionality provided by a MAP as described in RFC 4140, but additionally comprises functionality as described herein. In particular, the primary functionality of an EN is to gather QoS, security and mobility information from various parts of the access network and to share this information with other logical entities within the access network. The functionality of such an EN is extended by the present invention as described herein. It is possible for any of the access networks to have any number of ENs, each located at any point in the network. Each of the functions performed by an EN is described below:

1) Mobility Management: The mobility component of the network sub-layer provides the framework to manage all mobility management-related functionality within an access network, as well as facilitating the mobility of terminals across access networks. The entity enhances existing mobility management mechanisms by providing additional information to make decisions regarding the movement of nodes both within (intra) and across (inter) access networks. The framework also provides a method for the mobility entity to interact with QoS parameters in the network through the QoS entity in the EN. The mobility component part of the EN plays the role of Mobility Agent in HMIPv6 (see RFC 4140).

2) Quality of Service: The QoS component of the EN plays a vital role in providing QoS both within and between heterogeneous networks. This entity provides a virtual link between access networks to share information regarding resources and other QoS parameters. For example, a per-flow based QoS architecture such as IntServ can benefit with the additional knowledge of the network in providing resource reservations and reducing blocking probability. Re-establishing traffic flows after handover can also be enhanced by this entity, with the greater overview knowledge of the network, traffic flows can be optimally redirected to the new destination with minimum possible delays. This entity will work closely with routing in the network in identifying the paths with the required QoS. Traffic flow and congestion management also come under this entity. The QoS entity can interact with other entities performing tasks such as traffic shaping, congestion control, traffic flow management and QoS routing.

3) Signalling: The signalling entity of the EN plays an important part. This entity enables the EN to gather information and share information through signalling other ENs. It is desirable to make use of a common signaling approach where possible to minimise the delay associated with signalling sequentially. This allows the EN to process mobility and QoS combined signalling from the mobile nodes (MNs) or other entities thus preventing sequential signalling which contribute to large delays. The signalling used here could utilise a common signalling approach such as the QoS conditionalised handover binding update in X. Fu, H. Karl, and C. Kappler, "QoS-Conditionalized Handoff for Mobile IPv6," in *Networking* 2002, ser. LNCS, vol. 2345, 2002, pp. 721-730.

In some embodiments of the invention (for example those in which the access network employs DiffServ or a similar protocol) the access network 16 also comprises a Bandwidth Broker (BB) 36. The BB 36 is a logical entity that is stored and executed on a network node within the domain. Further details of the architecture and function of Bandwidth Brokers can be found in "A Discussion of Bandwidth Broker Requirements for Internet Qbone Deployment", Neilson, R. et al., August 1999 to which reference is specifically made, hereinafter referred to as Neilson, the full contents of which is incorporated herein for all purposes. For example the BB 36 may function on the gateway GW 32 in the access network 14, or it may reside on a physically separate network node. The purpose of the BB 36 is to manage the QoS resources within a domain based on the Service Level Specifications (SLSs) that have been agreed in that domain (intra-domain communication), and to manage communication with other BBs in different domains (inter-domain communication). In this case, the BB 36 is responsible for the QoS resources in the access network 14. Given a specific QoS request by a mobility agent or other BB, a BB determines whether or not the requested QoS can be met by network nodes (usually routers) within the domain from one gateway in the domain to another. Each BB has access to the routing table of the network node on which it resides; accordingly by means of link state advertisement discussed in RFC 2676 it is aware of the QoS level (e.g. bandwidth) available over all links in its domain.

Figure 2A:
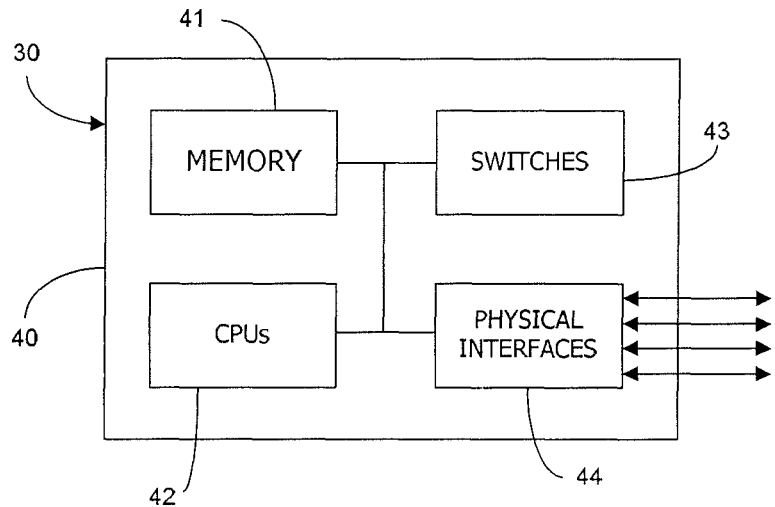
FIG. 2A is a schematic block diagram of computer hardware for storing and operating logical entities according to the present invention.

Referring to FIG. 2A one of the routers 24 comprises a housing 40, a memory 41, one or more CPU 42, switches 43 and physical interfaces 44. The physical interfaces 44 enable communication over a wired or wireless physical link with other routers 30 in the access network 14. The memory 41 may store computer executable instructions that when executed bring about the functionality one or more of the various logical entities described herein, e.g. MR 20, MRHA 26, AR 30, GW 28, and EN 32, 34, 36.

Figure 2B:
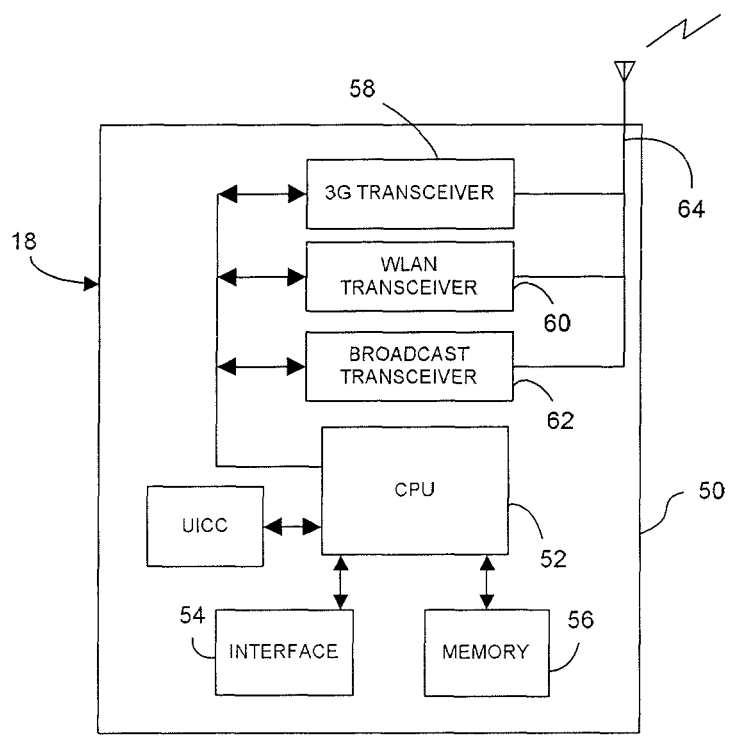
FIG. 2B is a schematic block diagram of a mobile node according to the present invention.

Referring to FIG. 2B a VMN 22 on the moving network 18 comprises a case 50 housing a CPU 52, an interface 54, a computer memory 56, a 3G transceiver (or interface) 58, a WLAN transceiver (or interface) 60 and a broadcast transceiver (or interface) 62. The 3G transceiver 58 and the broadcast transceiver 62 are wired to an antenna 64 for reception and transmission of data with a mobile network and/or the access point in the moving network 18, and for reception of data from a broadcast network respectively. The WLAN transceiver 60 enables reception and transmission of data with wireless access points. The CPU 52 interfaces with all of the aforementioned components to process (store, access, etc.) electronic data. The memory 56 stores computer executable instructions that when executed by the CPU 44 perform the mobile node method steps as described herein. These computer executable instructions may be stored in the memory of the mobile during manufacture. It is to be noted that it is not essential for the mobile node to be multi-mode; the invention also has application for mobile nodes with only one interface, e.g. a WLAN or 3G transceiver.

Handover or Login Phase

When the moving network 18 wishes to attach to the access network 16 (e.g. when the mobile router 20 moves it into the area of coverage of a Node B) it either awaits receipt of or solicits one or more Router Advertisement from an access router, in this case access router 30. The Router Advertisement comprises a MAP option that provides details of the or each target EN (distance vector from the mobile router, preference for the particular EN, the EN's global IP address and subnet prefix). The term 'target' is used purely for convenience to distinguish between a 'serving' EN (which may be located in the same or a different access network) with which the mobile router 20 is already registered, and a 'target' EN that is a potential candidate for registration.

Assuming that several MAP options are received advertising different ENs, the mobile router 20 selects one of the ENs with which to register using the distance vector and/or preference value in the MAP option. The mobile router 20 then uses the network prefix in the MAP option to auto-configure both a regional and a local care-of address to register with the target EN 34. To do this the mobile router 20 follows the procedure described in RFC 4140 to which reference is specifically made in this respect (see in particular section 6.1).

During normal operation all messages sent or received by MNs, be it control-type messages or data, traverse the MR 20. Thus, the MR is able to intercept QoS request messages (e.g. RSVP Path and Resv messages, and or network login type messages which comprise desired QoS parameters) from the mobile nodes attached to the MR 20, examine the traffic characteristics (e.g. represented by a flowspec or other QoS indicator) being requested by each, and record those requests in an internally maintained database or otherwise, before forwarding them to execute the reservation procedure.

In particular, the MR intercepts any QoS-request messages and analyses the details of the request by looking at the QoS related parameters, e.g. Tspec and RSpec, (which may include parameters such as requested bandwidth, delay and jitter, for both the uplink and downlink). It will then classify each QoS-request message into one of a set number of traffic profiles based on the delay and other delay-related requirements, for example into one of the four traffic classes of UMTS (i.e. conversational, streaming, interactive and background). Instead of simply forwarding each Resv and Path message onto the access network, the MR 20 uses the QoS database it has stored to determine a total QoS requirement for each traffic profile; the combination of these total QoS requirements is herein referred to as a 'QoS aggregate', that is the total QoS requirements of all nodes in the moving network 18. This QoS aggregate can be used to generate separate QoS-requests, e.g. an RSVP Resv and Path messages, for the entire QoS requirements of the moving network 18. These messages are addressed to the MRHA 26 and sent to the access network to which the moving network 18 is presently attached in order to trigger reservation of resources up to the MRHA 26. If the QoS requirements change (e.g. if new sessions are commenced and/or others finished) the MR 20 simply sends revised Resv and/or Path messages as per RFC 2205 section 2.3, or may send other QoS-request messages.

Once many sessions are underway, the moving network 18 appears to the access network 14 or 16 as a single mobile node that requires unusually large resources e.g. in terms of reserved bandwidth. For example there may be many tens or even hundreds of VMNs on a train and the mobile router 20 handles all of the sessions for the VMNs and any other sessions of LFNs and/or LMNs. Since all of the IP packet data (both uplink and downlink) is tunneled through the NEM-OBT established between the mobile router 20 and the MRHA 26, there is no possibility for IP packets to take different routes through the access network to spread the load.

A further problem arises in that, for an access network operating a tunneling-type micro-mobility protocol such as HMIPv6, packet data is also forced through a single mobility agent. In view of the potentially very high resource requirements it is quite likely that no single mobility agent in an access network will be able to meet the QoS requirements of the whole moving network 18. As a result the mobile router 20 will have to blindly seek alternative mobility agents with which to make a resource reservation, or negotiate a lower resource reservation with the intention of either dropping the sessions of some terminals, or proportionally reducing the QoS given to all sessions. In either case, handover latency will be increased.

In order to address this problem, when the moving network 18 performs a handover (either inter or intra access network) the QoS aggregate of the moving network 18 (i.e. its entire QoS requirement) is split into two or more smaller QoS aggregates, and each of those smaller QoS aggregates is registered with a different mobility agent.

How the MR 20 proceeds at this stage of the handover is dependent on whether or not the handover is an inter-access network handover or an intra-access network handover. To determine which is applicable, the MR examines each MAP option that it receives and compares the advertised network prefix against the or each RCoA that it has registered: any new network prefixes indicate the possibility of an inter-access network handover, whereas if the advertised network prefix matches one or more of the existing RCoAs an intra-access network handover is possible.

Inter-Access Network Handover

When the MR 20 enters the wireless coverage area of a new access network, and a handover is deemed necessary to the new network, the MR 20 must transfer all ongoing sessions from the serving access network 14 to the target access network 16, as shown in FIG. 1. In this embodiment, the handover is network-controlled and the target EN 34 performs most of the signalling. However, an alternative possibility is for the handover to be controlled by the MR 20 and this is described in greater detail below in the second embodiment. Furthermore, it is assumed that the moving network 18 is moving from the access network 14 in FIG. 1, which does not operate any tunneling-type micro-mobility protocol, to the access network 16, which does.

Figure 3:
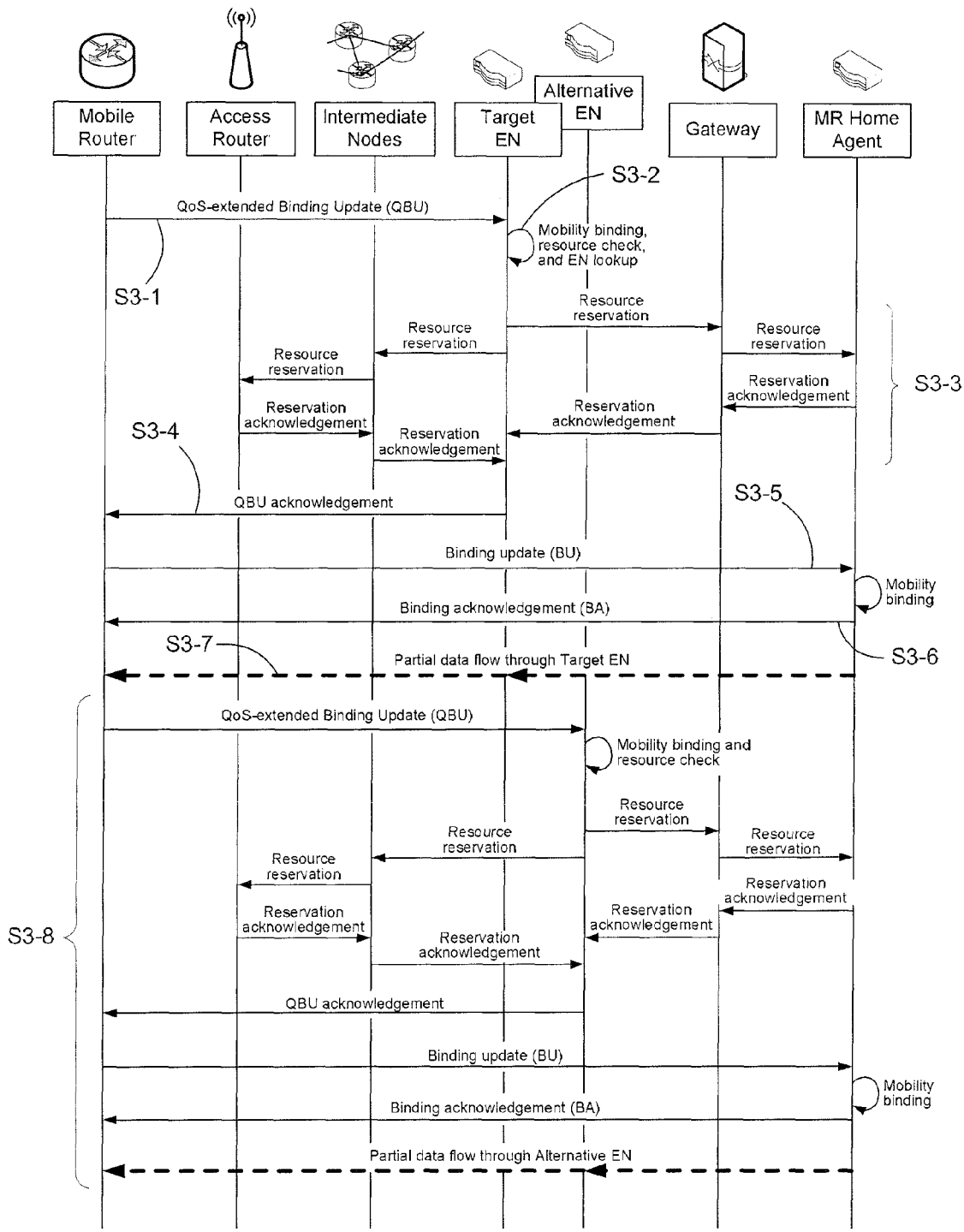
FIG. 3 is a signalling diagram of an inter-access network handover of a moving network to an access network according to the present invention.

Referring to FIG. 3, once the MR 20 has auto-configured the RCoA and LCoA as described above, it composes a combined mobility and QoS request. The purposes of this message is to enable the access network 16 to perform mobility (e.g. register bindings) and QoS (e.g. take admission decisions) procedures in one step, before sending any acknowledgement to the mobile router 20. By performing mobility and QoS procedures together handover delay and packet loss is reduced. In this embodiment the combined mobility and QoS request is a QoS-extended binding update (QBU) message. The QBU message is based on the local binding update message described in RFC 4140 and a flag is used in the reserved part of the message to indicate to the target EN 34 that the local binding update is in fact a QBU message rather than a normal HMIP binding update. Using the aforementioned QoS database, the MR 20 places the desired QoS parameters for each traffic profile in the Mobility options part of the QBU message. The QoS parameters represent the entire QoS aggregate and may include characteristics of all of the traffic and/or each traffic class, including upper and lower bounds of bandwidth, delay and jitter. To enable resources to be reserved both upstream and downstream the QoS parameters may be included in the form of a Tspec (characterising traffic to be sent by the MR 20 into the access network 16) and a flow descriptor (comprising Rspec and filter specification), characterising traffic to be received by the MR 20 from the access network 16; and whether or not the upstream and downstream traffic is to receive guaranteed QoS or controlled load.

At step S3-1 the MR 20 sends the QBU message to the target EN 34 using the global IP address advertised in the MAP option. At step S3-2 the target EN 34 firstly performs duplicate address detection (DAD) on the RCoA that the MR 20 has configured; if successful the target EN creates a binding for the MR 20 mapping the RCoA to the LCoA. The target EN 34 then examines the QoS parameters contained in the QBU message and determines whether or not it can meet the requirements for each traffic profile. To do this the target EN 34 performs an admission test in which the available bandwidth of the EN is determined and compared to that requested in the QBU message. If the target EN 34 is unable to meet the requested QoS requirements, it looks up alternative EN(s) in the access network 16 that might be able to meet some or all of the MR's QoS aggregate request. The table used for this lookup is stored in a memory of the target EN 34; the table may be created and managed manually by an administrator of the access network 16.

At step S3-3 the target EN 34 triggers reservation of the resources that it can provide for the moving network 18; this is done in two 'legs': a first leg from target EN to MR 20 (both upstream and downstream), and a second leg from target EN to MRHA 26 (both upstream and downstream). Since RSVP over IntServ is receiver-initiated, the target EN 34 must trigger the MR 20 to send RSVP Resv messages. Firstly the target EN 34 generates the appropriate QoS parameters (e.g. a Tspec) characterising the traffic that it will send to the MR 20 i.e. in a downstream direction. These parameters are based on (1) the QoS parameters the target EN 34 received from the MR 20 (e.g. flow descriptor) and (2) the QoS parameters it has decided during the admission test that it is able to provide. An RSVP Path message is then generated comprising these QoS parameters, and the message sent to the LCoA of the MR 20. The RSVP Path message enables the routers between the target EN 34 and the MR 20 to route the RSVP Resv messages along the correct downstream route back to the target EN 34. Upon receiving the RSVP Path message, the MR 20 reads the Tspec and responds with an RSVP Resv message comprising a flow descriptor that matches the Tspec sent in the Path message by the target EN 34. The Resv message causes resources to be reserved along the downstream route from target EN 34 to MR 20.

To reserve the resources in the upstream direction between the MR 20 and target EN 34, the MR 20 now sends an RSVP Path message to the target EN 34. The Tspec of this Path message is not important, as the target EN 34 will simply respond with an RSVP Resv message comprising a flow descriptor that it can support. On receipt of the Path message, the target EN 34 sends a Resv message to the MR 20, thereby reserving resources along the upstream route set by the Path message.

For the second leg, i.e. between the target EN 34 and MRHA 26, a similar process takes place except that the target EN 34 sends firstly an RSVP Path message with a Tspec characterising the upstream traffic it will send to the MRHA 26. In response, the MRHA 26 sends a Resv message with QoS parameters matching the Tspec of the Path message. This triggers the MRHA 26 to send an RSVP Path message to the target EN 34 for downstream traffic; it is not important what the Tspec of this message is since the target EN 34 will only reserve the resources it can provide. Upon receiving the Path message the target EN 34 sends a Resv message to reserve the resources along the downstream route established by the Path messages; the flow descriptor of the RSVP Resv messages match what the target EN 34 is able to provide for the MR 20.

If the access network 16 employs DiffServ, the process of resource reservation is somewhat simpler. In particular, upon receiving the QBU message, the target EN 34 forwards the requested QoS parameters (contained in the Mobility options part of the message) to a bandwidth broker (not shown in FIG. 1) which takes an admission decision. The bandwidth broker either accepts or declines all or a part of the request and sends the target EN 34 a suitable acknowledgement. If the bandwidth broker cannot accept the whole QoS aggregate through the target EN 34, it examines its link state database to determine if any other EN in the access network could handle some or all of the remaining part of the QoS aggregate. If so, the bandwidth broker sends the or each identity of the appropriate EN to the target EN 34.

Once these resources have been reserved in the access network 16, the target EN 34 sends a QBU acknowledgement message to the MR 20 at step S3-4. This message may be based on the Binding Acknowledgement described in RFC 4140 for example. The QBU acknowledgement comprises data representing:

(i) the RCoA assigned to the MR 20 (which may be different to the one contained in the original QBU message, following DAD by the target EN 34);

(ii) the amount of resources reserved for the MR 20 by the target EN 34 (which might be expressed as a certain bandwidth, one or more permitted traffic class, or a combination of both); and (iii) resources available at alternative ENs with which the MR 20 may establish a QoS route.

Regarding (ii) the QBU acknowledgement may inform the MR 20 that only certain resources have been reserved; for example the target EN 34 may have reserved resources only for delay-sensitive traffic such as VoIP and streaming sessions. Regarding (iii) the QBU acknowledgement may simply comprise a list of one or more alternative EN, or more detail may be included, such as how much bandwidth is available at each alternative EN and/or the traffic class(es) that it will accept within that bandwidth.

Upon receipt of the QBU acknowledgement, the MR 20 reads the message and firstly notices that its request for registration has been successful (at least in part). In response the MR 20 prepares and sends Binding Update (BU) to the MRHA 26 at step S3-5. Since the target EN 34 cannot meet the entire QoS requirements of the MR 20, a flag is used from the reserved bits of the BU message to indicate that the BU is not a normal BU message. In particular, the flag causes the MRHA 26 to add the new RCoA (available from the source address of the BU) to its binding cache, but not delete the or each other RCoA in the binding cache. In this way two or more NEMOBTs are created for the MR 20. In this example there are two: one NEMOBT passes across the access network 14 and the other passes across the access network 16.

One alternative would be for the MR 20 to send all current RCoA(s), including the new RCoA being registered by the BU, in the Mobility Options part of the BU. Upon receiving the BU, the MRHA 26 would compare the list against its current binding cache and amend the cache to be consistent. Accordingly the MRHA 26 may either remove one or more binding entry, create one or more new binding entry, or do nothing. In this particular example, assuming that the MR 20 had only one RCoA prior to this inter-access network handover, the BU would comprise two RCoAs: one in the access network 14 and one in the new access network 16.

Another flag in the BU indicates to the MRHA 26 whether or not the Mobility Options also carries a list of one or more traffic class. Upon receiving a BU with this flag set, the MRHA 26 operates a traffic splitting algorithm as follows. Depending on the circumstances, the MR 20 may either leave the Mobility Options empty or may provide the list. In the first case it may be that the MR 20 has only one type of traffic (e.g. web browsing) at that point in time and therefore packets can be split at random between the RCoAs i.e. randomly tunneled either through the new or the old NEMOBT. In the second case the MR 20 uses the Mobility Options part of the BU to inform the MRHA 26 which traffic classes the target EN 34 has indicated that it will handle. For example, the target EN 34 may only be able to handle the conversational and streaming traffic classes of the MR 20. In that case the MRHA 26 updates its binding cache to associate the new RCoA with traffic of that type. Packets arriving at the MRHA 26 are examined by a packet classifier (which reads the TOS field for example). Packets are then sent either via one NEMO tunnel or the other according to their traffic type. In another example, the target EN 34 may have indicated that it will only handle a maximum bandwidth for the MR 20, but is indifferent as to which type of traffic is passes through it. In that case, the MRHA 26 would send only a certain bandwidth through the new NEMOBT via the target EN 34, e.g. 5 MB s$^{-1}$, whilst the remainder e.g. 8 MB s$^{-1}$ would be sent through the old NEMOBT.

The traffic splitting algorithm is open to custom implementation by the network operator. One possible mechanism would be to split traffic according to application type, such that delay sensitive traffic is sent across the least congested path. The splitting algorithm may also take the velocity of the moving network into account (the velocity may be obtained using GPS for example—the velocity of the moving network could be sent by the mobile router in a periodic signalling message), and send the highest priority traffic through the EN to which the connection is most stable. The stability may be a function of the wireless signal strength experienced by the MR and this signal strength may be reported periodically (e.g. every 10 s, 30 s or 60 s) to the MRHA. The MRHA may choose the most stable network as that network from which the MR is experiencing the best signal strength. This might be assessed on the basis of the most recent signal strength reported, comparison with a threshold, or on the basis of a moving average for example.

A similar procedure happens at the MR 20 for upstream traffic. In particular, whichever traffic the target EN 34 has accepted in the upstream direction can be sent by the MR 20 via the new NEMOBT. Similarly, if the target EN 34 has indicated that it will handle only certain types of traffic or a maximum bandwidth, the MR 20 will act accordingly by tunneling packets with the appropriate RCoA, through either the new or the old NEMOBT.

Accordingly at step S3-7 a portion of the packets begin to be tunneled in both directions between the MRHA 26 and the MR 20 via the target EN 34 using the new NEMOBT. The remainder of the packets follow the old NEMOBT from the MRHA 26 to the MR 20.

The MR 20 now looks in the QBU acknowledgement for one or more alternative EN that might be able to provide some or all of its remaining QoS requirements. Assuming that an IP address of an alternative EN is found, the MR 20 sends a QBU message to the alternative EN and, as shown in FIG. 3 at step S3-8, the same steps (S3-1 to S3-7) are repeated with the alternative EN. In this second QBU message, the MR 20 requests the entire balance of its QoS aggregate to be met by the alternative EN, although it is possible for the MR 20 to request some fraction of the outstanding balance.

Upon receipt of the second QBU acknowledgement, the MR 20 either has all of the remaining part of the QoS aggregate met by the alternative EN, or there may still be some QoS requirement outstanding. The second QBU acknowledgement may suggest some other EN that might be able to meet the remaining requirement. It is possible that this other EN may be the target EN 34 (for example if there were only two ENs in the access network 16). To avoid the MR 20 being 'bounced' between ENs, the MR 20 stores a record of the or each EN that it has already sent a QBU message to in the current handover. During that handover, no further QBU message should be sent to any of these ENs. The process of sending QBU messages to new alternative ENs can be repeated until all options are exhausted, or may be stopped after a pre-determined number of attempts, e.g. three.

Once the MR 20 sends a BU to the MRHA 26, there are now two or more NEMOBTs through the access network 16 which together serve some or all of the QoS aggregate of the MR 20. In any event, the network should be able to support a greater proportion of the QoS aggregate than a single mobility agent would otherwise. If the entire QoS aggregate has been met by one or more EN in the access network 16, the binding in the MRHA 26 for the MR 20 to the previous access network 14 will eventually expire leaving only the bindings to RCoA(s) in the new access network 16. Alternatively, once handover at the physical and link layers has been completed, the MR 20 may cause this 'old' NEMOBT to be torn down by sending a final BU that lists only one or more EN in the access network 16.

When the MR 20 moves but stays within the EN domain with which it is registered, no global change in its RCoA is necessary, as per HMIP. Instead the MR 20 sends a local binding update to the EN 34 which binds the new LCoA to the existing RCoA. If the access network uses DiffServ, no QoS reservation needs to take place since the MR 20 already has a reservation with the bandwidth broker. If the access network employs IntServ resources will need to be reserved between the EN 34 and the new access router. This is achieved as per the second leg of resource reservation as described above.

Intra-Access Network Handover

Figure 4:
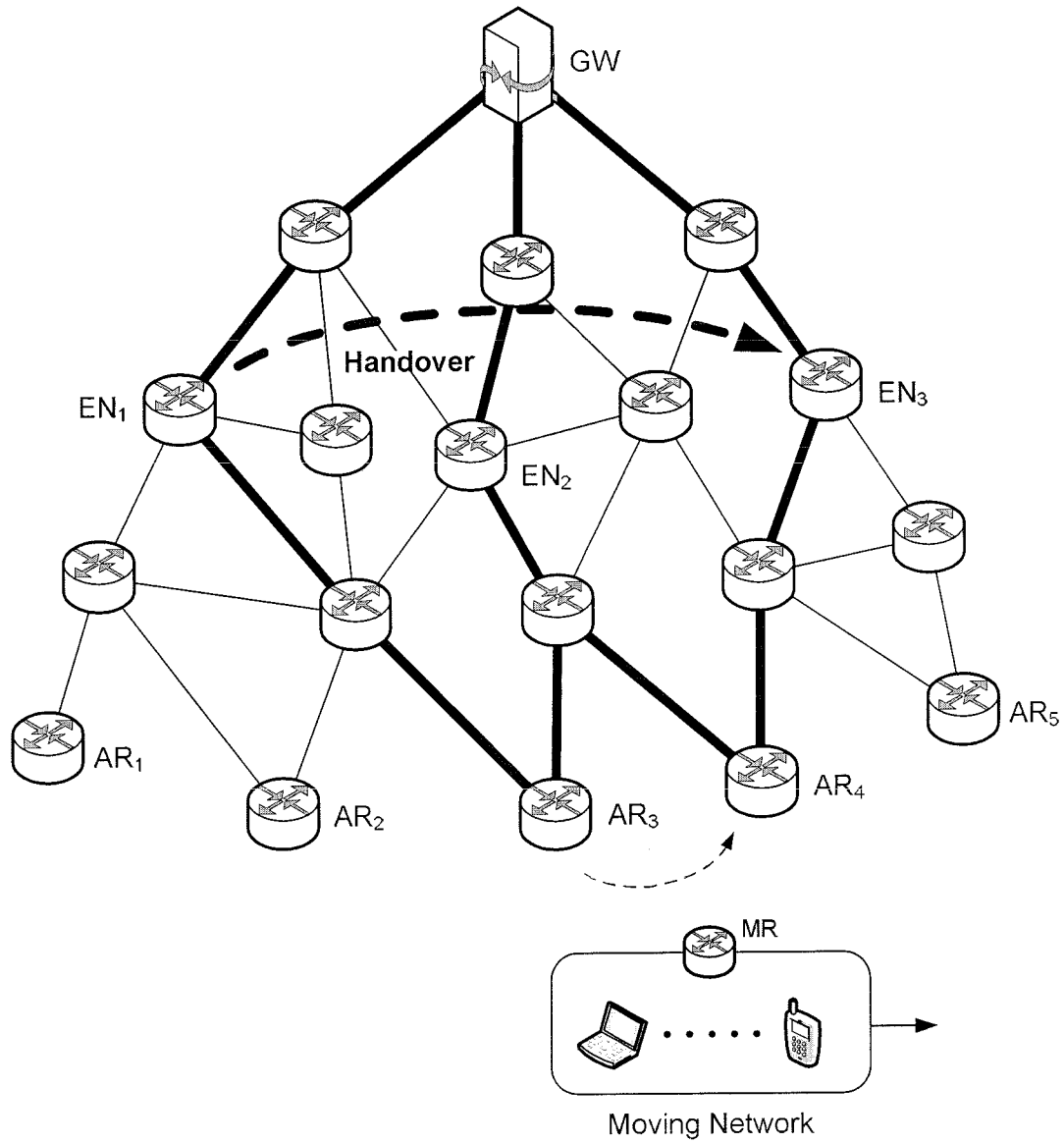
FIG. 4 is a block diagram of part of the network environment of FIG. 1 illustrating an intra-access network handover of the a moving network.

Whilst the MR 20 is attached to the access network 16, and since the access network utilises a micro-mobility tunneling protocol, the MR 20 may at any time handover from one access router to another without changing any of its RCoAs. However, if the MR's QoS requirements change or if the MR 20 moves to the edge of the domain of one of its ENs, it may be necessary for the MR 20 to perform an intra-access network EN handover. FIG. 4 shows an example scenario where the MR 20 wishes to handover from $EN_1$ to $EN_3$, whilst maintaining its registration with $EN_2$.

The MR 20 sends a QBU message to $EN_3$ using the MAP option it has received in a router advertisement, sent by $AR_4$ for example. Upon receipt $EN_3$ initiates steps S3-1 to S3-7 in order to reserve resources for the some or all of the QoS aggregate of the MR 20. $EN_3$ sends a QBU acknowledgement to the MR 20 informing it what resources have been reserved. Assuming that $EN_3$ can meet the same level of QoS that $EN_1$ provided, the MR 20 may simply send a BU to the MRHA 26 comprising the RCoA it has at the $EN_2$ and $EN_3$. The absence of the RCoA of the MR at $EN_1$ acts as a trigger for the MRHA 26 to remove that RCoA from its binding cache. The resources that were reserved for the MR 20 through $EN_1$ will eventually expire in the absence of the required periodic RSVP Resv messages.

Fallback Mechanism

In the event that only one EN is available in an access network, or where the QoS aggregate cannot be met by a combination of ENs, the MR 20 should establish other QoS-enabled paths directly with the MRHA 26 using the NEMO Basic Support protocol (see RFC 3963). In this way the MR 20 can bypass the EN(s) and use less congested paths. However, the penalty is that BUs to the MRHA 26 become more frequent as one BU is required for each handover between access routers. Therefore, use of such paths should preferably be reserved for delay-tolerant applications such as e-mail and file transfer. To prevent these normal binding updates from replacing the entire binding cache for the MR 20 at the MRHA 26 with one RCoA (since other paths through one or more EN may still be in use), the MR 20 uses the modified BU described above in which a flag is set to indicate that the MRHA 26 should act as above.

EN Resource Information Exchange

Each EN should as far as practical contain up to date information about neighbouring ENs, to allow it to suggest alternative ENs to the MR 20 when it cannot meet the QoS aggregate requirements of the moving network 18. To facilitate in the exchange of such information, one possibility is for a Bandwidth Broker (BB) to be located in each access network which acts as a common point for all ENs in the access network to update their resource availability. ENs must ensure that the BB is kept up to date about their resource availability. The BB will then, either periodically or otherwise, broadcast EN resource information to all ENs within the AN, to allow each to make decisions about alternative ENs. Existing protocols such as the simple network management protocol (SNMP) (see RFC 3411) can be used to facilitate the exchange of such information between the BB and ENs. A BB could be used with an access network employing either Diff-Serv or IntServ for example. An alternative is for the access network to operate an intra-domain link state routing algorithm such as QoSPF, whereby each router in the access network builds and stores a routing table with the link cost to every other destination within the administrative domain of the network. In this way, each EN will be able to make an admission decision by using such a routing table when a QBU message is received from a MR.

An alternative to the aforementioned network-controlled handover method is a mobile router-controlled method, which removes the restriction to use a QoS protocol supporting reservation procedures, such as IntServ with RSVP. The mobile router-controlled method is similar to the network-controlled method, except that QoS reservations are triggered by the MR instead of the EN.

Figure 5:
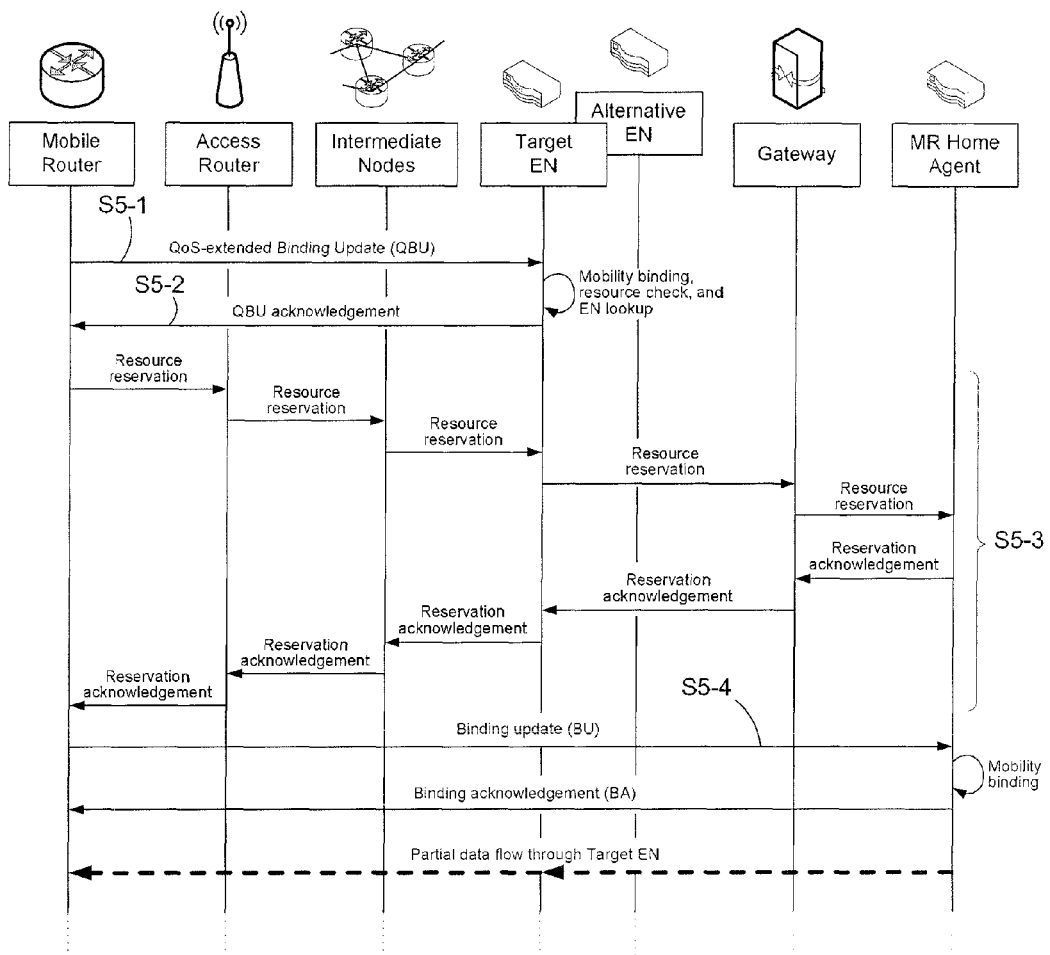
FIG. 5 is a signalling diagram of the intra-access network handover shown in FIG. 5.

An example of the MR-controlled method is shown in FIG. 5. At step S5-1 the MR 20 sends a QoS request in the form of a QBU message to the target EN 34. Upon receiving the QBU message, the target EN 34 checks its available resources and looks up one or more alternative EN that might also be able to provide resources. At step S5-2 the target EN responds with a QBU acknowledgement message; this is similar to that described above, except that a flag is set to indicate to the MR 20 that no resources have been reserved yet. The QBU acknowledgement indicates the resources the target EN 34 can accommodate, as well as information about alternative EN(s) that might be able to meet its remaining resource requirements. The MR 20 triggers resource reservation by sending an RSVP Path message to the target EN 34, establishing a route for upstream traffic from the MR 20. Upon receipt the target EN 34 then sends an RSVP Resv message to the MR 20 (reserving resources in the upstream direction along the route), and sends an RSVP Path message to the MR 20 to establish the route for downstream traffic with a Tspec matching the QoS parameters it will provide. The MR 20 responds by sending an RSVP Resv message to reserve resources for traffic in the downstream direction along the route. In order to reserve resources between the target EN 34 and MRHA 26 in both directions, a similar process takes place. This is started by the target EN 34 upon receipt of the RSVP Path message from the MR 20. Once all reservation acknowledgements have been received, the MR 20 sends a binding update to the MRHA 26 at step S5-4 in the same way as that described in the first embodiment. The remaining bindings and reservations carried out with the alternative suggested ENs follow the same procedure as with the target EN 34; only the first phase is shown in FIG. 4, as the subsequent phases are very similar to the first.

Embodiments of the invention enable a moving network utilising a mobile router to perform a handover within (intra) and between (inter) micro-mobility-enabled access networks, and to take advantage of micro-mobility, but at the same time ensuring that:

(i) the QoS of a number, and preferably most sessions is preserved: in particular, under a micro-mobility protocol such as HMIPv6, packets must flow through the bottleneck presented by the mobility agent before reaching the mobile router. With the potentially large number of sessions of a moving network, there is a possibility that no single mobility agent would have the capacity for all flows served by the mobile router, requiring some sessions to be dropped, or the QoS of all sessions proportionally reduced. At least some embodiments of the present invention reduce the need to take such action by providing the mobile router with knowledge of alternative mobility agents, enabling set up of multiple mobility agent registrations, and distribution of the traffic amongst those mobility agents.

(ii) there is little or no perceivable interruption (from the end-user's perspective) in communications: currently, mobile routers must first establish a binding with a EN, and then carry out resource reservation procedures. If a reservation is rejected by the EN due to insufficient resources, the EN must take further courses of action, albeit in a somewhat blind fashion, until all or most sessions have been connected through the new access network. The time taken to carry out such procedures may cause a perceivable interruption in communications to users. At least some embodiments of the present invention attempt to reduce any perceived interruption in communication by:

(a) combining QoS operation with mobility management operation;

(b) allowing available capacity at the EN with which the first registration is attempted by the MR to be granted to a portion of the sessions in the interim, until the aggregate QoS requirements of the moving network have been satisfied.

In embodiments of the invention in which an access network employs DiffServ over an intra-domain link state routing algorithm the entities transmitting packets (MR, EN and MRHA) may use source routing that is either strict or loose. At one extreme the MR and MRHA may use loose source routing that only requires packets to pass through a certain EN; the remaining routers can be determined on a hop-by-hop basis. Each EN may also use loose source routing for any packets that it sends either downstream to the MR or upstream to the MRHA. At another extreme the EN, MR and MRHA may use strict source routing to specify the complete path to the destination.

The term handover as used herein includes inter-MAP domain handover within one access network i.e. where mobility agents are located in the same administrative domain, and inter-access network handover from one access network to another i.e. where mobility agents are located in different administrative domains.

The MNs 22 may be a hand-held mobile terminals such as a cellular/mobile phones, PDAs, digital media players or notebook computers for example.

It will be appreciated that the invention is applicable to all varieties of micro mobility protocols and QoS routing protocols.

Examples of moving networks include, but are not limited to:

(a) networks attached to people ("Personal Area Networks" or PANs): a mobile phone with one cellular interface and one Bluetooth interface together with a Bluetooth-enabled PDA. The mobile phone is the MR while the PDA is used for web browsing or runs a personal web server;

(b) networks of sensors and computers deployed in vehicles: vehicles are provided with an increasing number of processing units for safety and ease of driving, as well as Internet access for passengers;

(c) access networks deployed in public transportation (buses, trains, taxis, aircraft, etc.): they provide Internet access to IP devices carried by passengers (e.g. laptop, camera, mobile phone representing host mobility within network mobility, or PANs i.e. network mobility within network mobility or "nested mobility"); and (d) ad-hoc networks connected to the Internet via a MR: for example students in a train that need to set up an ad-hoc network amongst themselves and then enable the ad-hoc network with Internet access through the MR.

Mobile routers may be installed in a wide range of vehicles including private vehicles (e.g. cars, motorbikes), public transport and military vehicles (aircraft, tanks, lorries, boats, etc.)

Although the embodiments of the invention described with reference to the drawings comprises computer apparatus and methods performed in computer apparatus, the invention also extends to computer programs, particularly computer programs on or in a carrier, adapted for putting the invention into practice. The program may be in the form of source code, object code, a code intermediate source and object code such as in partially compiled form, or in any other form suitable for use in the implementation of the methods according to the invention. The carrier may be any entity or device capable of carrying the program. For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal that may be conveyed via electrical or optical cable or by radio or other means.

When the program is embodied in a signal that may be conveyed directly by a cable or other device or means, the carrier may be constituted by such cable or other device or means. Alternatively, the carrier may be an integrated circuit in which the program is embedded, the integrated circuit being adapted for performing, or for use in the performance of, the relevant methods.

The invention claimed is:

1. In a wireless network environment comprising a mobile router serving a moving network, said mobile router for attaching to a packet-switched access network that uses a micro-mobility protocol and a Quality of Service (QoS) protocol to route packet data to and from said mobile router, wherein said mobile router has a QoS aggregate requirement generated by nodes attached thereto, a method of handover of said mobile router to a mobility agent in said access network, which method comprises the steps of:
   (i) said mobile router sends a QoS request message to said mobility agent, which QoS request message comprises a QoS parameter representing said QoS aggregate;
   (ii) upon receipt by said mobility agent, said access network takes a QoS admission decision on the basis of said QoS parameter; and
   (iii) said mobility agent sends a QoS acknowledgement to said mobile router whereby
said mobility agent informs said mobile router of the outcome of said QoS admission decision; characterized by the step of
   (iv) if said QoS admission decision is that said mobility agent cannot handle all of said QoS aggregate, said QoS acknowledgement comprises an identity of one or more alternative mobility agents capable of meeting at least a part of said QoS aggregate that will not be provided by said mobility agent;
   said mobile router registering with at least two mobility agents, and sending at least one Binding Update to a mobile router home agent whereby each care-of address (RCoA) of said mobile router at each mobility agent is stored in a binding cache of said mobile router home agent, so that traffic passing between said mobile router home agent and said mobile router is split between at least two tunnels, each tunnel passing through a different mobility agent, whereby said access network is able to support a greater proportion of said QoS aggregate than would otherwise be supported by a single mobility agent.

2. A method according to claim 1, wherein said QoS request comprises a Binding Update message in which said QoS parameter representing said QoS aggregate is sent within a Mobility Options part of said Binding Update message, whereby upon receipt of said Binding Update said mobility agent is informed both about a care-of address that said mobile router intends to use and a desired QoS.

3. A method according to claim 1, wherein said QoS admission decision comprises determining a proportion of said QoS aggregate that said mobility agent can provide, and sending data representing said proportion in said QoS acknowledgement to said mobile router, said proportion being in terms of traffic class or in terms of bandwidth.

4. A method according to claim 3, wherein upon receipt of said QoS acknowledgement said mobile router sends a further QoS request to one of said one or more alternative mobility agent, which further QoS request seeks reservation of the remainder of said QoS aggregate that has not been admitted by said access network through said mobility agent.

5. A method according to claim 4, further comprising the steps of said mobile router sending QoS requests to different mobility agents, until said QoS aggregate is supported by said access network via a number of different mobility agents, until no untried mobility agents are left in said access network, or until a predetermined number of QoS requests have been sent by said mobile router.

6. A method according to claim 1, wherein said QoS acknowledgement comprises a Binding Acknowledgement type message and said identity of said one or more alternative mobility agent is sent within a Mobility options part of said Binding Update.

7. A method according to claim 6, wherein data representing QoS that will be provided by said mobility agent for said mobile router is sent in a Mobility Options part of said Binding Acknowledgement, whereby upon receipt of said Binding Acknowledgement said mobile router is informed both about a care-of address that has been registered by said mobility agent for said mobile router and about the QoS that said mobility agent is able provide.

8. A method according to claim 1, wherein said QoS acknowledgement further comprises an indication of resources available at said one or more other mobility agent.

9. A method according to claim 1, wherein said Binding Update comprises a list of the or each care-of address belonging to the mobile router, the method further comprising the step of upon receipt of said Binding Update said mobile router home agent amending its binding cache to match said list.

10. A method according to claim 9, wherein said Binding Update further comprises a QoS parameter which is mapped to a respective care-of address in said list, the method further comprising the step of said mobile router home agent splitting downstream traffic between said care-of addresses according to said QoS parameters.

11. A method according to claim 1, further comprising the steps of sending relatively delay intolerant traffic through one of said at least two tunnels, and sending relatively delay tolerant traffic through another of said at least two tunnels.

12. A method according to claim 1, further comprising the step of sending one or more class of traffic through one of said at least two tunnels, and sending at least one other class of traffic through another of said at least two tunnels.

13. A method according to claim 1, wherein step (i) follows completion of a mobility part of said handover.

14. A method according to claim 1, wherein said QoS request comprises a combined mobility and QoS request, whereby upon receipt of said combined request said mobility agent registers said mobile router in a binding cache for the purposes of mobility, and said access network takes said QoS admission decision for said QoS aggregate of said mobile router, before sending a combined mobility and QoS acknowledgement to said mobile router.

15. A packet-switched wireless access network comprising a mobile router serving a moving network, said mobile router for attaching to a packet-switched access network that uses a micro-mobility protocol and a Quality of Service (QoS) protocol to route packet data to and from said mobile router via a mobility agent, wherein said mobile router has a QoS aggregate requirement generated by nodes attached thereto, said mobility agent configured to:

(i) receive a QoS request message from said mobile router which QoS request message comprises a QoS parameter representing said QoS aggregate;
(ii) upon receipt of said QoS request message to cause said access network to take a QoS admission decision on the basis of said QoS parameter;
(iii) send a QoS acknowledgement to said mobile router whereby said mobility agent informs said mobile router of the outcome of said QoS admission decision; and
(iv) if said QoS admission decision is that said mobility agent cannot handle all of said QoS aggregate, said QoS acknowledgement comprises an identity of one or more alternative mobility agents capable of meeting at least a part of said QoS aggregate that will not be provided by said mobility agent;
said mobile router registering with at least two mobility agents, and sending at least one Binding Update to a mobile router home agent whereby each care-of address (RCoA) of said mobile router at each mobility agent is stored in a binding cache of said mobile router home agent, so that traffic passing between said mobile router home agent and said mobile router is split between at least two tunnels, each tunnel passing through a different mobility agent, whereby said access network is able to support a greater proportion of said QoS aggregate than would otherwise be supported by a single mobility agent.

16. A router for use in a wireless network environment comprising a mobile router serving a moving network, said mobile router for attaching to a packet-switched access network that uses a micro-mobility protocol and a Quality of Service (QoS) protocol to route packet data to and from said mobile router, wherein said mobile router has a QoS aggregate requirement generated by nodes attached thereto, which router comprises a memory storing computer executable instructions that when executed perform the steps of:
(i) receiving a QoS request message from said mobile router which QoS request message comprises a QoS parameter representing said QoS aggregate;
(ii) upon receipt of said QoS request message to cause said access network to take a QoS admission decision on the basis of said QoS parameter;
(iii) send a QoS acknowledgement to said mobile router whereby said mobility agent informs said mobile router of the outcome of said QoS admission decision; and
(iv) if said QoS admission decision is that said mobility agent cannot handle all of said QoS aggregate, said QoS acknowledgement comprises an identity of one or more alternative mobility agents capable of meeting at least a part of said QoS aggregate that will not be provided by said mobility agent;
said mobile router registering with at least two mobility agents, and sending at least one Binding Update to a mobile router home agent whereby each care-of address (RCoA) of said mobile router at each mobility agent is stored in a binding cache of said mobile router home agent, so that traffic passing between said mobile router home agent and said mobile router is split between at least two tunnels, each tunnel passing through a different mobility agent, whereby said access network is able to support a greater proportion of said QoS aggregate than would otherwise be supported by a single mobility agent.

* * * * *